(12) United States Patent
Le Bris et al.

(10) Patent No.: US 11,549,024 B2
(45) Date of Patent: Jan. 10, 2023

(54) TEMPERATURE INDICATOR FOR CULINARY ARTICLE

(71) Applicant: SEB S.A., Ecully (FR)

(72) Inventors: Stéphanie Le Bris, Chambery (FR); Anne Teissier, Annecy (FR)

(73) Assignee: SEB S.A.

( * ) Notice: Subject to any disclaimer, the term of this patent is extended or adjusted under 35 U.S.C. 154(b) by 59 days.

(21) Appl. No.: 16/626,107

(22) PCT Filed: Jul. 11, 2018

(86) PCT No.: PCT/EP2018/068772
§ 371 (c)(1),
(2) Date: Dec. 23, 2019

(87) PCT Pub. No.: WO2019/011975
PCT Pub. Date: Jan. 17, 2019

(65) Prior Publication Data
US 2020/0283646 A1  Sep. 10, 2020

(30) Foreign Application Priority Data
Jul. 11, 2017 (FR) .................................. 1756587

(51) Int. Cl.
| | |
|---|---|
| *C09D 5/29* | (2006.01) |
| *C09D 7/00* | (2018.01) |
| *A47J 36/02* | (2006.01) |
| *C09C 1/00* | (2006.01) |
| *C09D 5/18* | (2006.01) |
| *C09K 9/00* | (2006.01) |
| *G01K 11/12* | (2021.01) |
| *G01K 11/16* | (2021.01) |
| *C09D 7/40* | (2018.01) |
| *C09D 7/62* | (2018.01) |

(52) U.S. Cl.
CPC .............. *C09D 5/29* (2013.01); *A47J 36/025* (2013.01); *C09C 1/0006* (2013.01); *C09D 5/18* (2013.01); *C09D 7/62* (2018.01); *C09D 7/70* (2018.01); *C09K 9/00* (2013.01); *G01K 11/12* (2013.01); *G01K 11/16* (2013.01); *A47J 2202/00* (2013.01); *C01P 2004/84* (2013.01); *C01P 2006/32* (2013.01); *C01P 2006/40* (2013.01); *C01P 2006/60* (2013.01)

(58) Field of Classification Search
CPC ... C09D 5/29; C09D 7/70; C09D 7/62; C09D 5/18; A47J 36/025; A47J 2202/00; C09C 1/0006; C09K 9/00; G01K 11/12; G01K 11/16; C01P 2004/84; C01P 2006/32; C01P 2006/40; C01P 2006/60
USPC .......................................................... 252/583
See application file for complete search history.

(56) References Cited

U.S. PATENT DOCUMENTS

| | | | |
|---|---|---|---|
| 4,552,593 A | 11/1985 | Ostertag | |
| 4,677,000 A | 6/1987 | Gardaz et al. | |
| 5,350,448 A | 9/1994 | Dietz et al. | |
| 5,851,587 A | 12/1998 | Schittenhelm et al. | |
| 6,458,197 B1 | 10/2002 | Vermoortele et al. | |
| 2012/0052265 A1* | 3/2012 | Le Bris | A47J 37/10 |
| | | | 428/204 |
| 2013/0010827 A1 | 1/2013 | Pimia | |

FOREIGN PATENT DOCUMENTS

| | | |
|---|---|---|
| DE | 102014018464 A1 | 6/2016 |
| EP | 1086994 A1 | 3/2001 |
| EP | 1405890 A1 | 4/2004 |
| EP | 2413119 A1 | 2/2012 |
| FR | 2576253 A1 | 7/1986 |
| JP | 2019135273 A | 8/2019 |
| RU | 2560409 C2 | 8/2015 |
| WO | 2016152879 A1 | 9/2016 |

OTHER PUBLICATIONS

International Search Report from PCT/EP2018/068772 dated Oct. 11, 2018, 4 pages.
Yamei Li et al; "Core-shell VO2@TiO2 nanorods that combine thermochromic and photocatalytic properties for application as energy-saving smart coatings", Scientific Reports, vol. 3, No. 1, Apr. 2, 2013, 13 pages.

\* cited by examiner

*Primary Examiner* — Ling Siu Choi
*Assistant Examiner* — Ronald Grinsted
(74) *Attorney, Agent, or Firm* — Lerner, David, Littenberg, Krumholz & Mentlik, LLP

(57) ABSTRACT

The invention relates to a particle with a core-shell structure, the core of which comprises at least one thermochromic semiconductor and the shell comprises at least two layers—an inner layer in contact with the core and comprising a mineral material or an organo-mineral hybrid material; and—an outer layer comprising a mineral material or an organo-mineral hybrid material, different from that of the inner layer. The invention also relates to a method for producing this particle, and the use thereof as a temperature indicator, in particular in a culinary article, such as a pan.

7 Claims, 1 Drawing Sheet

| Grade | 10 | 9 | 8 | 7 | 6 | 5 | 4 | 3 | 2 | 1 | 0 |
|---|---|---|---|---|---|---|---|---|---|---|---|
| Evaluation | Raw $Bi_2O_3$ | good protection | | | | insufficient protection | | | | | |
| Color | Pale yellow | increasingly darker shades of yellow until black | | | | | | | | | |

TEMPERATURE INDICATOR FOR CULINARY ARTICLE

CROSS-REFERENCE TO RELATED APPLICATIONS

The present application is a national phase entry under 35 U.S.C. § 371 of International Application No. PCT/EP2018/068772 published in French and filed on Jul. 11, 2018, which claims priority from French Patent Application No. 1756587, filed on Jul. 11, 2017, the disclosures of which are incorporated by reference herein in their entirety.

FIELD OF THE INVENTION

The invention refers to particles having a core-shell structure, the method for producing said particles, and the use thereof as temperature indicators, particularly in a culinary article such as a pan.

BACKGROUND OF THE INVENTION

The use of semiconductor materials as temperature indicators is known on account of their ability to change color due to the effect of heat (thermochromism). In particular, there are known semiconductor materials whose properties allow for the possibility of a progressive and reversible change of color as the temperature rises following a sequence of white to yellow to orange to red and to black. These thermochromic semiconductor materials, possibly mixed with thermostable pigments, have the advantage of giving the coatings that contain them a reversible thermochromism with improved visibility and accuracy.

Among the thermochromic semiconductor materials, bismuth oxide has attractive properties in terms of thermochromism, since it is able to transition from a white-yellow coloring to a bright yellow coloring within a temperature range of between ambient temperature and 220° C., and this in a reversible way. In addition, it is known from patent EP 1405890 that bismuth oxide ($Bi_2O_3$) may be combined with a cobalt phosphate (a blue-colored thermostable pigment), with the pigments being bonded together by a potassium silicate. A coating containing this mixture is blue at ambient temperature and turns orange at 400° C.

However, these thermochromic semiconductors have a major drawback limiting their use, which is that they are not compatible with oils or lipids when used on a hot surface: they are referred to as liposensitive when hot. Indeed, semiconducting metal oxides are easily reduced with heat when in contact with oil or lipids, and the compounds formed after such a reduction reaction are no longer thermochromic. For example, $Bi_2O_3$ is reduced to metallic bismuth ($Bi^{(m)}$), which is a black-colored compound, in the presence of hot edible oils (fatty acid triglycerides), which does not have any thermochromic properties.

In addition, certain thermochromic semiconductors lose their properties when they are combined with certain compounds. For example, under certain conditions bismuth oxide formulated in the presence of polytetrafluoroethylene (PTFE) reacts with PTFE and leads to the formation of a white-colored bismuth oxyfluoride (BiOF) which has no thermochromic properties. This reaction may occur when hydrofluoric acid is released, even in a small amount, as a result of PTFE sintering, that is, during the heat treatment of PTFE.

For this reason, it has become necessary to offer solutions so that thermochromic semiconductors can be used under all conditions and to avoid the drawbacks described above.

BRIEF SUMMARY OF THE INVENTION

The inventors have found a solution for protecting thermochromic semiconductors, more specifically those which are liposensitive when hot, so as to protect them from their external environment, particularly in the case of an oil or lipid capable of reducing thermochromic semiconductors.

Consequently, the invention refers to a particle with a core-shell structure in which the core comprises at least one thermochromic semiconductor and the shell comprises at least two layers:
- an inner layer in contact with the core and comprising a mineral material or a hybrid organo-mineral material; and
- an outer layer comprising a mineral material or a hybrid organo-mineral material that is different from that of the inner layer.

The invention also refers to a method for producing such a particle.

The invention also refers to a thermochromic pigment composition comprising at least one particle according to the invention.

The invention also refers to a non-stick coating comprising the thermochromic pigment composition according to the invention.

The invention also refers to a culinary article comprising at least one non-stick composition and/or coating according to the invention.

The invention also refers to the use of the composition according to the invention as a temperature indicator in an object intended to be given a heat treatment or intended to produce heat, particularly in a culinary article.

The present invention has at least one of the following advantages:
- the particle according to the invention makes it possible to give a coating a thermochromic functionality with marked visibility, a contrasted color change over a targeted range of temperatures centered on food cooking temperatures;
- the particle according to the invention can provide a good verification of the temperature when cooking foods, which is necessary for health and taste reasons, but also for safety reasons and to limit momentary overheating that can damage the coating of the culinary article;
- the particle according to the invention is compatible with all kinds of compounds and can be included in all kinds of coatings, be they ceramic, enamel, sol-gel, or fluorocarbon resin, including PTFE;
- the particle according to the invention is compatible with use in the presence of oils or lipids, including at high temperature, because the particle is inert with respect to lipids or oils; no production of metallic bismuth is observed;
- the particle according to the invention is not sensitive to harsh chemical treatments;
- the particle according to the invention has reversible thermochromic properties, that is, after a change of color due to the effect of heat, the particle returns to its initial state and its initial color when the temperature drops; this color-change cycle (reversibility) can be repeated infinitely;
- the particle according to the invention has high thermal stability at high temperatures; it is stable up to the melting point of the semiconductor, for example up to 800° C. in the case of $Bi_2O_3$;

the particle according to the invention is resistant to acid degradation; in particular, it is not sensitive to hydrofluoric acid; as such, no bismuth oxyfluoride (BiOF) is produced in the presence of polytetrafluoroethylene (PTFE) in the case of $Bi_2O_3$;

the particle according to the invention is particularly resistant to abrasion;

the shell of the particle according to the invention is transparent, so it does not affect color perception of the particle's core and does not hinder observation of the thermochromism of the particle's core;

the particle according to the invention possesses improved durability with use thanks to the combination of all these performance properties mentioned above.

BRIEF DESCRIPTION OF THE FIGURES

FIG. 1 represents a grading scale used to qualify the color degradation in the thermochromism verification test (oil test) of the examples. The scale is adapted to shades of grey.

DETAILED DESCRIPTION

First of all, the invention refers to a particle with a core-shell structure in which the core comprises at least one thermochromic semiconductor and the shell comprises at least two layers:

an inner layer in contact with the core and comprising a mineral material or a hybrid organo-mineral material; and an outer layer comprising a mineral material or a hybrid organo-mineral material that is different from that of the inner layer.

The particle according to the invention is a particle with a core-shell structure comprising a core and a shell comprising layers, preferably two layers, but a multi-layer structure is also envisioned. Preferably, the layers of the shell of the particle according to the invention are continuous. According to a variant, it is possible for the inner layer to be discontinuous and for the outer layer to be continuous. Preferably, the outer layer is continuous.

In the present invention, the term "layer" must be understood as a continuous or discontinuous layer. A continuous layer (also referred to as a monolithic layer) is a single whole forming a full ink coverage over the surface on which it is placed. A discontinuous layer (or non-monolithic layer) may comprise a plurality of parts and thus is not a single whole.

The particle with a core-shell structure according to the invention may comprise at least one thermochromic semiconductor in its core. The thermochromic semiconductor is chosen from $Bi_2O_3$, $Fe_2O_3$, $V_2O_5$, $WO_3$, $CeO_2$, $In_2O_3$, the pyrochlore semiconductor $Y_{1.84}Ca_{0.16}Ti_{1.84}V_{0.16}O_{1.84}$, $BiVO_4$, and their mixtures.

These thermochromic semiconductors have specific colors, in particular:

$V_2O_5$ has an orangish-yellow color at ambient temperature;

$Bi_2O_3$ has an off-white or pale yellow or very slightly yellow color at ambient temperature;

$BiVO_4$ has a yellow color at ambient temperature;

$WO_3$, $CeO_2$, and $In_2O_3$ have a color very close to that of $Bi_2O_3$;

$Fe_2O_3$ has an orangish-red color at ambient temperature; and the pyrochlore $Y_{1.84}Ca_{0.16}Ti_{1.84}V_{0.16}O_{1.84}$ has an orangish-yellow color at ambient temperature.

In the present invention, the expression "thermochromic semiconductor" must be understood as a mineral or organic compound capable of a reversible change of color as the temperature rises. The progressive and reversible thermochromic characteristic of these semiconducting compounds is associated with the decrease in the forbidden bandwidth of the semiconductor due to expansion of the material. Indeed, the periodicity of the grid of anions and cations leads to a gathering of the energy levels in energy bands. The full energy band with the highest energy is called the valence band and the empty energy band with the lowest energy is called the conduction band.

There is a forbidden band between these two bands called the gap. The color of a semiconductor material can come from the presence of a charge transfer corresponding to the passing of an electron either from a conduction band to a valence band within the same atom, or commonly from the orbital of an anion to the orbital of a cation (interatomic photon absorption).

In the fields of application contemplated in the present invention, a heating article such as a culinary article or a heating article such as an iron is typically used in a temperature range of between 10° C. and 300° C. Within this temperature range, color changes of semiconductors occur according to the following progression: from pale yellow to bright yellow ($Bi_2O_3$), from orangish yellow to red-orange ($V_2O_5$), and from orangish red to brown ($Fe_2O_3$).

In the present invention, a "thermochromic substance, mixture, or composition" must be understood as a substance, mixture, or composition that changes color as a function of temperature, with said change being reversible.

The particle with a core-shell structure according to the invention may furthermore include in its core at least one thermochromic pigment and/or a second thermochromic semiconductor that is different from the first.

In the present invention, the expression "thermostable pigment" must be understood to mean a mineral or organic compound demonstrating a very small change in tint when it is subjected to a high temperature within a given temperature range, or even no change of color at all.

Preferably, the core of the particle according to the invention may furthermore include a mixture of at least one thermochromic pigment and at least one thermochromic semiconductor chosen from the mixtures ($Bi_2O_3+Co_3(PO_4)_2$), ($Bi_2O_3+LiCoPO_4$), ($Bi_2O_3+CoAl_2O_4$), ($Y_{1.84}Ca_{0.16}Ti_{1.84}V_{0.16}O_{1.84}$, $+Co_3(PO_4)_2$) and ($V_2O_5+Cr_2O_3$). In particular, when bismuth oxide $Bi_2O_3$ (thermochromic) and $CoAl_2O_4$ (thermostable, blue color) are combined in a mixture at a weight ratio of 15:1, with the pigments being bound by a potassium silicate, the coating containing this mixture is blue at ambient temperature and turns orange at 400° C.

Examples of weight ratios between the respective quantities of thermochromic semiconductors and thermostable pigments are indicated below, together with the color progression and the final color:

a mixture of $Bi_2O_3$ (pale yellow at ambient temperature) and $Co_3(PO_4)_2$ (thermostable purple), with a weight ratio of $Bi_2O_3$ to $Co_3(PO_4)_2$ of 3:1; this mixture is mauve at ambient temperature, then turns green at 200° C.;

a mixture of $Bi_2O_3$ (pale yellow at ambient temperature) and $LiCoPO_4$ (thermostable purple), with a weight ratio of $Bi_2O_3$ to $LiCoPO_4$ of 1:3; this mixture is purple at ambient temperature, then turns gray at 200° C.;

a mixture of $Bi_2O_3$ (pale yellow at ambient temperature) and $CoAl_2O_4$ (thermostable blue), with a weight ratio of $Bi_2O_3$ to $CoAl_2O_4$ of 30:1; this mixture is blue at ambient temperature, then turns green at 200° C.;

a mixture of $V_2O_5$ (orangish yellow at ambient temperature) and $Cr_2O_3$ (thermostable green), with a weight ratio of $V_2O_5$ to $Cr_2O_3$ of 1:1; this mixture is green at ambient temperature, then turns brown at 200° C.;

a mixture of $Y_{1.84}Ca_{0.16}Ti_{1.84}V_{0.16}O_{1.84}$ (orangish yellow at ambient temperature) and $(Co_3(PO_4)_2$ (thermostable purple), with a weight ratio of $Y_{1.84}Ca_{0.16}Ti_{1.84}V_{0.16}O_{1.84}$ to $Co_3(PO_4)_2$ of 1:4; this mixture is green at ambient temperature, then turns gray at 200° C.

The above list of combinations of thermochromic semiconductors and of thermostable pigments is not limiting and other combinations can be considered.

The principal effect of this combination of thermochromic semiconductors and thermostable pigments is that the range of accessible tints is particularly extensive. In addition, the perception of the change of tint is also enhanced: the mixture of a thermochromic semiconductor that progresses from off-white to bright yellow can in this way change from cyan-blue to lemon green if combined with a blue pigment.

Since the maximum sensitivity of the human eye is centered around wavelengths corresponding to green, this mixture will not necessarily produce higher colorimeter parameter changes than the thermochrome alone, but the human eye will better perceive this change.

The particle with a core-shell structure according to the invention comprises an inner layer in contact with the core; this inner layer comprises a mineral material or a hybrid organo-mineral material. The mineral material or the hybrid organo-mineral material of the inner layer of the core of the particle according to the invention is preferably a material comprising one or more metal oxides chosen from the oxides of the following elements: Al, Si, Fe, Zr, Ce, Ti, B, Mg, Sn, Mn, Hf, Th, Nb, Ta, Zn, Mo, Ba, Sr, Ni, and Sb. The mineral material or the hybrid organo-mineral material of the inner layer of the core is preferably a material comprising one or more silicon oxides.

Advantageously, the particle with a core-shell structure according to the invention comprises an outer layer comprising a mineral material or a hybrid organo-mineral material that is different from that of the inner layer. The mineral material or the hybrid organo-mineral material of the outer layer of the core, which is different from that of the inner layer, is preferably a material comprising one or more metal oxides chosen from the oxides of the following elements: Al, Si, Fe, Zr, Ce, Ti, B, Mg, Sn, Mn, Hf, Th, Nb, Ta, Zn, Mo, Ba, Sr, Ni, and Sb. The mineral material or the hybrid organo-mineral material of the outer layer of the core, which is different from that of the inner layer, is preferably a material comprising one or more aluminum oxides (alumina or $Al_2O_3$).

Preferably, the mineral material or the hybrid organo-mineral material of the inner layer of the shell of the particle according to the invention is a material comprising one or more silicon oxides, and the inorganic material or the hybrid organo-mineral material of the outer layer of the shell of the particle according to the invention is a material comprising one or more aluminum oxides.

As a general rule, the outer layer never comes into contact with the core.

According to a first variant, the inner layer and the outer layer are in contact with each other.

According to a second variant, the particle according to the invention has a shell furthermore comprising a middle layer made of a mineral material or a hybrid organo-mineral material lying between the inner layer and the outer layer. This middle layer may be made of a material identical to or different from that of the inner layer or the outer layer.

Advantageously, the particle according to the invention generally has a $d_{50}$ of between 800 nm and 1,000 μm, preferably a $d_{50}$ of between 900 nm and 700 μm, and more preferably a $d_{50}$ of between 1,000 nm and 500 μm. The size of the particles or their grain size is generally determined by laser analysis. Their size is expressed by the $d_{50}$.

The $d_{50}$, also referred to as the $Dv_{50}$, corresponds to the 50th percentile of the particle size distribution by volume, that is, 50% of the particles have a smaller size than the $d_{50}$ and 50% have a larger size than the $d_{50}$.

Advantageously, the particle according to the invention generally has a shell with a thickness of between 5 and 500 nm, preferably of between 10 and 250 nm, and more preferably of between 15 and 100 nm.

Advantageously, the particle's shell is transparent and continuous, which allows it to fulfill its role as a colored temperature indicator.

Advantageously, the particle according to the invention undergoes a reversible color change within a defined temperature range, depending on the thermochromic semiconductor encapsulated in particle's core.

Advantageously, the particle according to the invention has the property of being inert with respect to an oil generally up to a temperature of about 450° C., and more specifically with respect to fatty acid triglyceride oils of plant, animal, or synthetic origin, and by extension with respect to fatty acid esters (mono, di, or pluri fatty acid esters).

The present invention also refers to a method for producing the particle according to the invention, comprising the following steps:

i) providing a thermochromic semiconductor powder;

ii) dispersing the powder provided in step i) in a mixture of at least one metal alkoxide sol-gel precursor, water, and alcohol in order to initiate a hydrolysis-condensation phase, and continuously stirring the resulting mixture;

iii) separating the particles obtained in step ii) from the reagents and solvents that did not react;

iv) applying a heat treatment to the particles obtained in step iii) at a temperature of between 200° C. and 600° C. for at least 10 minutes;

v) placing the particles obtained in step iv) in a fluidized bed reactor, then heating the reactor to a temperature of between 100° C. and 500° C.;

vi) placing water alternating with a metal oxide precursor in the heated reactor;

vii) obtaining the particles with a core-shell structure.

Step i) may include grinding of the thermochromic semiconductor if it comes in the form of a solid with a coarse grain size, for example greater than 10 μm, so as to obtain a fine powder. Preferably, the thermochromic semiconductor has a $d_{50}$ of between 1 and 10 μm, and more preferably of between 1 and 9 μm after step i). Preferably, a grade of thermochromic semiconductor powder having a small particle size is selected and it is advantageous to encapsulate the particles of thermochromic semiconductor powder while avoiding clumping. Indeed, after encapsulation (step ii), the resulting particle can no longer be ground because of the risk of breaking or cracking the protective shell. In this way, the final particles according to the invention will have sufficiently small particle sizes to allow for easy dispersion in the formulation and enable good color coverage of the resulting coating.

Advantageously, the method according to the invention may include an optional step between steps i) and ii) for a heat treatment of the thermochromic semiconductor powder, with the heat treatment taking place at a temperature of between 100° C. and 600° C., preferably between 200° C. and 500° C., and more preferably between 400° C. and 450° C. This optional heat treatment allows for initial activation of the surface of the particles.

Step ii) is the step in which the inner layer of the particle shell is formed. This step involves bringing the powder obtained in step i) into contact with a metal alkoxide sol-gel precursor, water, and an alcohol. The purpose of step ii) is to initiate the hydrolysis-condensation phase. This contact preferably takes place in two steps, by dispersion of the powder in the mixture formed by the metal alkoxide and the alcohol, and then by adding water to initiate the hydrolysis-condensation phase. The pH of this water may be adjusted in advance to a basic pH by adding ammonia, for example. To initiate silane hydrolysis, water with an adjusted pH is slowly added with stirring to the dispersion. The water is added to stoichiometric excess according to a ratio R of between 1 and 10, preferably between 2 and 5, with R being equal to the number of moles of water divided by the number of moles of silanol groups of the silane (advantageously, R=2.5 in the examples).

In step ii) of the method according to the invention, the metal alkoxide sol-gel precursor is preferably an alkoxysilane precursor, such as methyltrimethoxysilane (MTMS), tetraethoxysilane (TEOS), methyltriethoxysilane (MTES), and dimethyldimethoxysilane or their mixtures, preferably tetraethoxysilane (TEOS).

The quantity of TEOS $[m_{TEOS}]$ used can be calculated so as to correspond to a target thickness $[e]$ of the shell as a function of the specific area $[S]$ and the used mass $[m_{Bi}]$ of the ground semiconductor. Assuming that the particles are perfectly spherical and that all the particles have the same radius $[r]$, the quantity of TEOS to be used is given by the following formula:

$$m_{TEOS} = 1.26 \times m_{Bi} \times \left[\frac{(r+e)^3}{r^3} - 1\right] \text{ with } r = 3.4 \times 10^{-7} \times \frac{1}{S}$$

Tests show that a theoretical inner layer thickness of 30 nm yields good results. The thickness of the inner layer must not be too thin to provide effective protection, nor too thick to avoid disrupting the color properties of the thermochrome.

In step ii) of the method according to the invention, the alcohol is generally a primary, secondary, or tertiary alcohol such as methanol, ethanol, or preferably isopropyl alcohol, or one of their mixtures.

Advantageously, step ii) of the method according to the invention is conducted at a basic pH, that is, strictly greater than 7, preferably at a pH of between 8 and 12, and more preferably between 9.5 and 11.5.

In order to obtain a basic pH in step ii), the pH may be adjusted by adding a base. Preferably, an aqueous solution of ammonia is added in step ii) of the method according to the invention.

Advantageously, step ii) of the method according to the invention is conducted at ambient temperature, preferably at a temperature of between 12 and 30° C.

Advantageously, step ii) is continued with stirring at ambient temperature for a period of between 20 minutes and 24 hours, preferably between 30 minutes and 12 hours, and more preferably between 1 and 5 hours.

Step iii) of the method according to the invention is used to retrieve the particles obtained in step ii) by separating them from the reagents and solvents that did not react. This can be done by filtering, decanting, centrifuging, or any other phase separation technique.

Step iv) of the method according to the invention is used to apply a heat treatment to the particles obtained in step iii) at a temperature of between 200° C. and 600° C. for at least 10 minutes. This is a step for densification of the inner layer of the particle shell, that is, the density of the material is increased. In this way, the material of the inner layer will be less porous. The heat treatment temperature is preferably between 350° C. and 575° C., and more preferably between 450° C. and 550° C.

Tests have shown that a densification at 500° C. for 30 minutes provided effective protection. Times or temperatures strictly below 350° C. are not adequate to effectively cross-link and densify the silica grid, and times or temperatures strictly greater than 600° C. worsen the effectiveness of the protection (deterioration probably due to a shattering of the inner layer on account of differences in thermal expansion).

Advantageously, the particle according to the invention generally has an inner layer thickness of between 2 and 200 nm, preferably of between 5 and 100 nm, and more preferably of between 10 and 50 nm.

Step v) of the method according to the invention is used to introduce the particles obtained in step iv) into a fluidized bed reactor, then to heat the reactor to a temperature of between 100° C. and 500° C. The reactor heating temperature is preferably between 120° C. and 400° C., and more preferably between 150° C. and 200° C. Advantageously, the particles are in suspension in the fluidized bed.

In step vi) of the method according to the invention, a metal oxide precursor is introduced into the previously heated reactor. In this way, this metal oxide precursor volatilizes due to the effect of the heat. The metal oxide precursor can be chosen from silica tetrachloride, tungsten hexafluoride, tetramethoxysilane $(Si(OCH_3)_4)$, tetraethoxysilane $(Si(OC_2H_5)_4)$, trimethylaluminum $(Al(CH_3)_3)$, triethylaluminum $(Al(C_2H_5)_3)$, aluminum trialkyl compounds, yttrium acetylacetonate, cobalt acetylacetonate, and their mixtures. Preferably, the metal oxide precursor is an aluminum precursor such as trimethylaluminum (TMA). Preferably, step vi) is conducted by depositing an atomic layer (ALD or Atomic Layer Deposition).

Step vi) is used to deposit a thin atomic layer on the surface of the particle, said layer preferably being monoatomic. Step vi) preferably comprises a successive deposition of ultra-thin monoatomic layers. According to one variant, step vi) can be repeated successively to increase the thickness of the thin layer.

Advantageously, the particle according to the invention generally has an outer layer thickness of between 2 and 200 nm, preferably of between 5 and 100 nm, and more preferably of between 10 and 50 nm.

In step vii) of the method according to the invention, particles according to the invention with a core-shell structure are obtained.

The invention also refers to a thermochromic pigment composition comprising at least one particle according to the invention.

The composition according to the invention may in addition include at least one thermostable pigment as defined above, such as a thermostable pigment chosen from $Co_3(PO_4)_2$, $LiCoPO_4$, $CoAl_2O_4$, $Cr_2O_3$ and one of their mixtures.

The composition according to the invention has the same properties and advantages as those described above for the particle, in particular it can change color reversibly when the temperature rises.

The present invention also refers to a non-stick coating comprising the thermochromic pigment composition according to the invention.

The terms "non-stick" and "anti-adhesive" are used interchangeably in the text.

In the invention, the term "coating" must generally be understood as a coating comprising at least three layers:
- a first layer applied directly to the substrate, referred to as the bonding layer or primer layer or bonding primer; it is preferable for this layer to adhere firmly to the substrate and to provide the coating with all its mechanical properties: hardness, scratch resistance;
- a layer comprising a thermochromic pigment composition according to the invention, possibly bonded with a thermostable binder and possibly in combination with a thermostable pigment; this layer is also referred to as a decorative layer or décor;
- a continuous and transparent surface layer referred to as a finish layer; this layer allows for perfect visibility of the layer of thermochromic pigment composition while protecting it against abrasion and giving the coating its non-stick properties.

Advantageously, as the binder, the non-stick coating according to the invention comprises a binder that is thermostable to at least 300° C. The thermostable binder used in the coating layers is preferably a binder that is thermostable to at least 300° C. and which can be chosen advantageously from enamels, fluorocarbon resins, or a mixture of fluorocarbon resins, either alone or in a mixture with other thermostable resins, polyester-silicone resins, silicone resins, fluorosilicones, polybenzimidazoles (PBI), polyimides, and inorganic polymers or hybrid organic/inorganic polymers synthesized by the sol-gel process (sol-gel materials).

The fluorocarbon resin can be polytetrafluoroethylene (PTFE), tetrafluoroethylene copolymer, and perfluoropropyl vinyl ether (PFA) or a copolymer of tetrafluoroethylene and hexafluoropropylene (FEP), or a mixture of these fluorocarbon resins. Other thermostable resins withstanding at least 200° C. can consist of a polyamide-imide (PAI), an ethylene polysulfide (PES), a phenyl polysulfide (PPS), a polyetherketone (PEK), a polyetheretherketone (PEEK), or a silicone. Lastly, it is possible to use a silicone resin or a polyester-silicone resin as a thermostable binder.

Advantageously, as the binder, the non-stick coating according to the invention comprises a silicone resin or a polyester-silicone resin.

Advantageously, the non-stick coating according to the invention comprises a binder chosen from the silicates, the borates, the phosphates of alkali metals or alkaline earth metals and their mixtures.

Advantageously, the non-stick coating according to the invention comprises as a binder a sol-gel material comprising a matrix of at least one metal polyalkoxylate and at least 5% by weight, in relation to the total weight of the coating, of at least one colloidal metal oxide dispersed in said matrix. In the case of binders based on a sol-gel material, said material may advantageously comprise a matrix of at least one metal polyalkoxylate and at least 5% by weight, in relation to the total weight of the coating, of at least one colloidal metal oxide dispersed in said matrix.

The non-stick coating according to the invention can be an organo-mineral coating or an entirely mineral coating.

In the present invention, an "organo-mineral coating" must be understood as a coating in which the grid is essentially inorganic but which comprises organic groups, particularly in light of the precursors used and the baking temperature of the coating, or in light of the inclusion of organic fillers.

In the present invention, an "entirely mineral coating" must be understood as a coating consisting of an entirely inorganic material free of any organic groups. Such a coating may also be obtained by a sol-gel process with a baking temperature of at least 400° C., or from tetraethoxysilane (TEOS) precursors with a baking temperature which may be less than 400° C.

The thermostable binder mentioned above may be present either in the bonding layer or in the decorative layer or in the finish layer, or in all three layers, or in two out of the three layers.

It is preferable for these various layers (and therefore their respective thermostable binders) to be compatible with each other. But the binders are not required to be identical in all the layers. Consequently, it is possible to have a silicone resin binder in the second layer whereas the binder in the base coating and/or the finish coating can be a sol-gel material.

Also preferably, the décor is applied by silk screen printing or pad printing. In particular, the above décor may be applied according to the method described in French patent FR 2576253.

The color change is visible through the thermostable binder layer in which the particles according to the invention are embedded, as this layer is transparent. In the event that the base coating consists of a fluorocarbon resin such as PTFE and the décor is also based on a fluorocarbon resin, the baking of the base coating and the décor allows the resin particles of the décor to sinter together with the resin particles of the base coating, and when the baking is simultaneous, the resulting simultaneous sintering provides for an excellent bond of the décor to the first layer.

The color change of the thermochromic semiconductor allows the user to be warned that the article is hot and therefore entails a burn risk, and also indicates that the surface of the article has reached the right temperature for its use. Preferably, the first layer and the décor are covered with a continuous layer of thermostable binder, preferably consisting of a transparent fluorocarbon resin (finish layer) which is also baked simultaneously together with the base coating resin and the décor resin, allowing all the particles to be sintered together with each other. The resulting surface thus achieves optimum non-stick properties which are not affected by the presence of the décor.

In certain variants, the décor is continuous or discontinuous. Naturally, the décor may consist of any other forms, such as concentric circles, letters, or drawings. When the décor is continuous, it may cover the entire surface of the substrate.

The décor may include at least two patterns, one containing a chemical compound that darkens with rising temperature and the other containing a chemical compound that brightens with rising temperature. In this way, the contrast produced between the two patterns allows for better perception of the temperature change.

According to another variant, the décor may include at least two patterns, one comprising at least one thermochrome and the other comprising at least one thermostable.

The present invention also refers to a culinary article comprising at least one thermochromic pigment composition according to the invention and/or a non-stick coating according to the invention.

In the present invention, the expression "culinary article" must be understood as an object intended to be given a heat treatment or an object intended to produce heat.

In the present invention, the expression "object intended to be given a heat treatment" must be understood as an object that will be heated by an external heating system, such as a pot, pan, skillet, wok, and barbecue grill, and which is capable of transferring the heat energy provided by said external heating system to a material or food in contact with said object.

In the present invention, the expression "object intended to produce heat" must be understood as a heating object having its own heating system, such as an iron, hair straightener, steam generator, or an electrical appliance intended for cooking.

The invention also refers to the use of the particle, composition, or coating according to the invention as a temperature indicator, particularly in an object intended to be given a heat treatment, particularly in a culinary article, or intended to produce heat.

The invention also refers to the use of the particle, composition, or coating according to the invention as a temperature indicator in a culinary article.

EXAMPLES

Characterization of Particles and Shells

In order to perform a macroscopic evaluation of the quality of the shell on the core-shell structure particles according to the invention, two types of observations are made:
- a visual observation of maintained color and thermochromic properties of the particles according to the invention: this verification is based on a comparison at ambient temperature and after heating to between 100° C. and 300° C. of the change in color of the thermochromic semiconductor not encapsulated in the core of a particle, and the change in color of the same thermochrome encapsulated in the core of a particle according to the invention; the color differences must be minimal;
- oil testing of the particles: this test consists in evaluating the effectiveness of the protection provided to the thermochromic semiconductor encapsulated in a particle by simulating the usage conditions of a culinary article by cooking with fats.

Thermochromism Verification Method: Oil Test

This test is conducted as follows:
1.0 g of encapsulated or non-encapsulated thermochromic semiconductor to be tested is placed in a 100 mL beaker; 25 mL of peanut oil is added; the thermochromic semiconductor is manually dispersed in the oil using a spatula;
the beakers are placed in a kiln for a heat treatment at 200° C. for 9 hours, or at 270° C. for 2 hours for an accelerated test;
the beakers are removed from the kiln and allowed to cool in open air, then the thermochromic semiconductor is filtered and cleaned, its color and thermochromism are observed; the color variation of the thermochromism (between the thermochromic semiconductor before the oil test and after the oil test) must be minimal.

After the test, several observations are made:
Upon leaving the kiln hot, the homogeneity of the color of the thermochromic semiconductor bed is observed;
After cooling: the color of the supernatant oil is observed. Then, after the excess oil has been removed, the color of the thermochromic semiconductor bed and its homogeneity are graded using a grading scale.

When the thermochromic semiconductor is liposensitive to oil, it loses its thermochromism, and in the case of $Bi_2O_3$ it turns black.

The grading scale represented on FIG. 1 may be used to qualify the color degradation.

To characterize the thickness and continuity of the inner and outer layers of the particle's shell, Transmission Electron Microscopy (TEM) observations are made of samples prepared using the following three steps: 1) dispersion of the semiconductor in ethanol without grinding; 2) ultrasound bath for 10 min;
3) deposition on a copper grid covered with a carbon membrane with holes.

Various tests of the culinary article according to the invention are also conducted to evaluate the aging of the temperature indicator built into an article as cooking is performed over time:
oil test: the bottom of the article is covered with oil and heated to 200° C. for 9 hours;
cooking of steaks: 10 steaks are cooked in succession in the article;
use test: steaks, potatoes, green beans, lamb chops, and crepes are cooked alternatingly in the article so as to simulate the daily use of the article as closely as possible.

Products
thermostable pigment: $Co_3(PO_4)_2$ (purple at ambient temperature),
thermochromic semiconductor: $Bi_2O_3$ (which is off-white with a slight yellow tint at ambient temperature) in powder form,
silica shell: obtained by a sol-gel process from tetraethoxysilane (TEOS) as a precursor,
colloidal silica in the form of an aqueous solution with 30% silica,
isopropyl alcohol,
alumina shell: trimethylaluminum (TMA),
sol-gel curing precursor: methyltrimethoxysilane (MTMS) or methyltriethoxysilane (MTES),
organic acid: acetic acid,
thickener: a methacrylic acid and acrylic ester copolymer,
solvent: propylene glycol,
oil: peanut oil,
binder: PTFE in the form of a dispersion.

Apparatus
a Raineri mixer equipped with a Supertest shearing blade marketed by the company VMI.

Principle for Producing a Particle According to the Invention
The bismuth oxide is encapsulated in a silica shell which forms a barrier and isolates the thermochromic semiconductor from its external environment. After good dispersion of the $Bi_2O_3$ powder in the reaction medium, a silica shell is formed by a sol-gel process from alkoxysilane precursors under alkaline conditions. After decanting, a powder is retrieved, washed, and dried. The shell thus formed is then densified by heat treatment so as to make it totally impermeable to fats. Then a deposit of alumina is applied to the inner silica layer by Atomic Layer Deposition. Particles with a core-shell structure in which the core comprises $Bi_2O_3$ are obtained.

Example 1: Producing a $Bi_2O_3$ Particle According to the Invention 1.1. Step i): Dispersion:

500 g of $Bi_2O_3$ semiconductor powder is coarsely sifted to remove clumps.

1.2. Step ii): Dispersion and Formation of the Inner Layer:

This step corresponds to initiation of the silica precursor hydrolysis-condensation.

300 g of isopropyl alcohol is poured into a glass beaker having a volume of 1,800 mL; it then undergoes vigorous mixing with a Raineri mixer equipped with a shearing blade. The 500 g of $Bi_2O_3$ powder obtained earlier is gradually introduced into the isopropyl alcohol with mixing, with the incorporation time being about 35 seconds. The resulting dispersion is left to continue with vigorous mixing for 25-30 minutes.

320 g of tetraethylorthosilicate (TEOS) is first added very slowly, with mixing, to the $Bi_2O_3$ dispersion in isopropyl alcohol.

In parallel, an alkaline aqueous solution of pH 11.3 is prepared according to the following ratio: 21 g of 10.25% $NH_4OH$ solution for 300 g of deionized water (utility water). This ammonia-containing aqueous solution is diluted in 50 g of isopropyl alcohol so as not to destabilize the $Bi_2O_3$/TEOS/isopropyl alcohol dispersion.

Then 276 g of this ammonia solution of pH 11.3 diluted in the isopropyl alcohol is added very slowly to the dispersion of TEOS and $Bi_2O_3$ in isopropyl alcohol.

The quantity of TEOS $[m_{TEOS}]$ used can be calculated so as to correspond to a target thickness [e] of the shell as a function of the specific area [S] and the mass $[m_{Bi}]$ of the ground $Bi_2O_3$ used.

Assuming that the particles are perfectly spherical and that all the particles have the same radius [r], the quantity of TEOS to be used is given by the following formula:

$$m_{TEOS} = 1.26 \times m_{Bi} \times \left[\frac{(r+e)^3}{r^3} - 1\right] \text{ with } r = 3.4 \times 10^{-7} \times \frac{1}{S}$$

The specific area of the powder [S] used was estimated at 2.5 m$^2$/g. The target thickness [e] was 30 nm and the mass $[m_{Bi}]$ of $Bi_2O_3$ used was 500 g.

Consequently, the calculated quantity of TEOS $[m_{TEOS}]$ was 320 g.

The hydrolysis-condensation is continued with vigorous mixing at ambient temperature and covered (beaker covered with aluminum foil) for 4 hours.

1.3. Step iii): Separation:

The particles obtained in step ii) are then extracted by decanting in combination with washing of the synthesis solvent and reagents that did not react.

1.4. Step iv): Densification:

In order to make the inner silica layer as impermeable as possible, a last thermal densification step is performed.

The particles obtained in step iii) are dried for 30 to 60 minutes in an infrared radiation drying chamber at about 100° C., then densified for 30 minutes at 500° C.

The particles obtained in this way have a core-inner layer morphology with a $Bi_2O_3$ core and a silica shell. This shell is continuous, impermeable to oil, transparent, thermally resistant to at least 450° C., and has a final particle grain size that allows for good dispersion in formulation.

1.5. Step v): Reactor Preparation:

A reactor with a volume of 175 mL is loaded with 100 g of $Bi_2O_3/SiO_2$ particles. The chamber is raised to 180° C. with a nitrogen flush and the product in the fluidized bed is allowed to dry for several hours.

1.6. Step vi): Alumina Deposit by Atomic Layer Deposition (ALD):

For an alumina deposit by ALD, the precursors used are trimethylaluminum (TMA) and water. The resulting reaction product is methane. The method is followed by an on-line residual gas analysis (RGA—Residual Gas Analyzer) to check the additions of precursors.

The introduction of TMA into the reactor is first initiated. Methane is then detected at the outlet of the fluidized bed; the TMA then is not detected because it is consumed in the reaction with the surface of the substrate; the TMA will continue to react with all the available reaction sites on the surface. Methane is then generated continuously. Once all the sites have reacted with the TMA, a moment which can be detected by RGA by a lowering of the methane level and a sudden jump in the TMA signal, the flow of TMA is stopped and water is introduced into the reactor in the gaseous phase. The reaction of water at all the sites on the surface is similarly followed by RGA, and when the hydrolysis is complete, the flow of water is stopped.

This TMA/$H_2O$ cycle is repeated 100 times.

1.7. Step vii): Obtaining Particles According to the Invention:

After 100 cycles of TMA/$H_2O$ deposition, the reactor is allowed to cool and a powder is unloaded. This resulting powdery yellow powder comprises core-shell particles according to the invention which are $Bi_2O_3$ coated with silica and then alumina.

A MET observation shows that all the resulting particles have a shell that is 30 to 50 nm thick. All the particles are covered with a continuous shell.

1.8. Oil Test:

The powder of core-shell particles according to the invention is initially evaluated using the oil test.

The color of this powder after 2 hours in an oil bath at 270° C. is graded in comparison to other powders as presented in the table below.

1.9 Production of a Temperature Indicator Based on $Bi_2O_3$ Particles Consisting Solely of the Inner Layer The $Bi_2O_3$ particles are prepared in the same way as in steps i) to iv) described in example 1, but without steps v) to vii). Consequently, the outer layer is not made, only the inner layer. A powdery yellow powder is then obtained. This powder demonstrates an adequate resistance to the oil test (grade of 7/10).

|  | Grade of 0 to 10 |
|---|---|
| $Bi_2O_3$ not coated | 0 |
| $Bi_2O_3$ coated with a single layer upon completion of step iv) (monolayer) | 7 |
| $Bi_2O_3$ coated with 2 layers upon completion of step vii) (invention) | 9 |

Example 2: Production of a Thermochromic Pigment Composition According to the Invention Comprising at Least One Particle According to the Invention A pigment paste containing a thermostable purple pigment based on cobalt phosphate, $Co_3(PO_4)_2$, is first prepared according to the formulation described below.

| Pigment paste P1 (in parts by mass) | |
| --- | --- |
| Purple pigment Co$_3$(PO$_4$)$_2$ | 31 |
| Water | 62 |
| propylene glycol | 4 |
| Thickener | 2 |
| NH$_4$OH | 1 |
| total | 100 |

A thermochromic pigment composition is then prepared by dispersion with a shearing blade (no grinding so as not to break the particle coating) from purple pigment paste P1 and Bi$_2$O$_3$ particles coated with silica and then alumina prepared according to the invention in example 1.

| Thermochromic pigment composition C1 (in parts by mass) | |
| --- | --- |
| Paste P1 | 32 |
| Particles prepared in example 1 | 26 |
| PTFE dispersion | 30 |
| Propylene glycol | 9 |
| NH$_4$OH | 1 |
| Thickener | 1 |
| Water | 1 |
| Total | 100 |

Example 3: Making of a Coating According to the Invention 3.1 Preparation of the First Layer A coating composition based on fluorocarbon resin, bonding resin, and mineral reinforcement fillers is prepared according to known conventional methods. This coating composition is filtered before it is applied with an air gun to the inside of a preformed aluminum cap. This substrate is first degreased and dusted for better adherence of the coating composition to the surface of the substrate, then the substrate is treated in order to increase its specific surface area. The coating is applied in at least one layer 5 to 50 microns thick. In the case of a multi-layer application, each layer is dried before application of the next layer.

Thermochromic pigment composition C1 according to the invention is applied to the dried coating under-layer by pad printing. For better visibility of the décor, the addition of a thermostable green indicator is recommended.

3.2 Preparation of the Surface Layer and Baking

A colorless coating composition comprising a PTFE dispersion, solvents, and conventional additives is prepared. The surface layer is made on the first layer and the décor in the same way as the first layer.

Once all the layers have been applied and dried, the article is baked at 430° C. for 11 minutes (sintering).

3.3 Evaluation of the Coating

The quality of the coating and of the thermochromic indicator thus made is assessed by visual observation of the color and the thermochromism of the coating.

In the described embodiment example, a thermal indicator that is mauve at ambient temperature and turns green at 200° C. is obtained. The various aging tests performed on the indicator (oil test, cooking of steaks, and usage test) show minimal change in the color of the indicator.

Comparison Example 1: Production of a Bi$_2$O$_3$ Particle with a Double Coating Consisting of 2 Layers of Identical Materials The Bi$_2$O$_3$ particles are prepared in the same way as in steps i) to iv) described in example 1, then steps ii) to iv) are repeated identically a second time. A powder of powdery yellow-colored particles is then obtained.

The resulting particles have a core-inner layer-outer layer morphology with a Bi$_2$O$_3$ core, a silica SiO$_2$ shell consisting of an inner layer of silica, and an outer layer of silica that is identical to the inner layer.

These particles have been tested in the oil test.

However, these particles demonstrate poor resistance in the oil test.

Indeed, the color of the powder after 2 hours in an oil bath at 270° C. is graded in comparison to other powders as presented in the table below.

| | Grade of 0 to 10 |
| --- | --- |
| Bi$_2$O$_3$ not coated | 0 |
| Bi$_2$O$_3$ coated with a single layer upon completion of step iv) (monolayer) | 7 |
| Bi$_2$O$_3$ coated with the 2 layers (comparison example 1) | 3 |

Comparison Example 2: Production of a Bi$_2$O$_3$ Particle Consisting Solely of the Outer Layer The Bi$_2$O$_3$ particles are prepared in the same way as in steps i[)] and v) to vii) described in example 1, but without steps ii) to iv). Consequently, the inner layer is not made, only the outer layer.

A non-thermochromic powdery gray powder is obtained. Indeed, the TMA precursor reacts with the Bi$_2$O$_3$ powder, which in this case does not have an inner silica shell, and the surface of the Bi$_2$O$_3$ particles is reduced to Bi($''''$). The resulting compound is black and does not possess any thermochromic properties.

The invention claimed is:

1. A culinary article comprising a non-stick coating, the non-stick coating including a thermochromic pigment composition having at least one particle with a core-shell structure in which the core comprises at least one thermochromic semiconductor and the shell comprises at least two layers:
    an inner layer in contact with the core and comprising a mineral material or a hybrid organo-mineral material; and
    an outer layer comprising a mineral material or a hybrid organo-mineral material that is different from that of the inner layer.

2. The culinary article according to claim 1, wherein the layers of the shell are continuous.

3. The culinary article according to claim 1, wherein the thermochromic semiconductor is chosen from Bi$_2$O$_3$, Fe$_2$O$_3$, V$_2$O$_5$, WO$_3$, CeO$_2$, In$_2$O$_3$, the pyrochlore semiconductor Y$_{1.84}$Ca$_{0.16}$Ti$_{1.84}$V$_{0.16}$O$_{1.84}$, BiVO$_4$, and their mixtures.

4. The culinary article according to claim 1, wherein the core further comprises at least one thermostable pigment and/or a second thermochromic semiconductor that is different from the first.

5. The culinary article according to claim 1, wherein the mineral material or the hybrid organo-mineral of the inner layer of the shell is a material comprising one or more silicon oxides.

6. The culinary article according to claim 1, wherein the mineral material or the hybrid organo-mineral material of the outer layer of the shell, which is different from that of the inner layer, is a material comprising one or more aluminum oxides.

7. The culinary article according to claim 1, wherein the mineral material or the hybrid organo-mineral material of the inner layer of the shell is a material comprising one or more silicon oxides, and the mineral material or the hybrid organo-mineral material of the outer layer of the shell is a material comprising one or more aluminum oxides.

* * * * *